Nov. 15, 1966  H. G. MUHLBAUER ET AL  3,285,920
COMBINATION PROCESS FOR PRODUCING
PIPERAZINE AND TRIETHYLENEDIAMINE
Filed Jan. 16, 1964
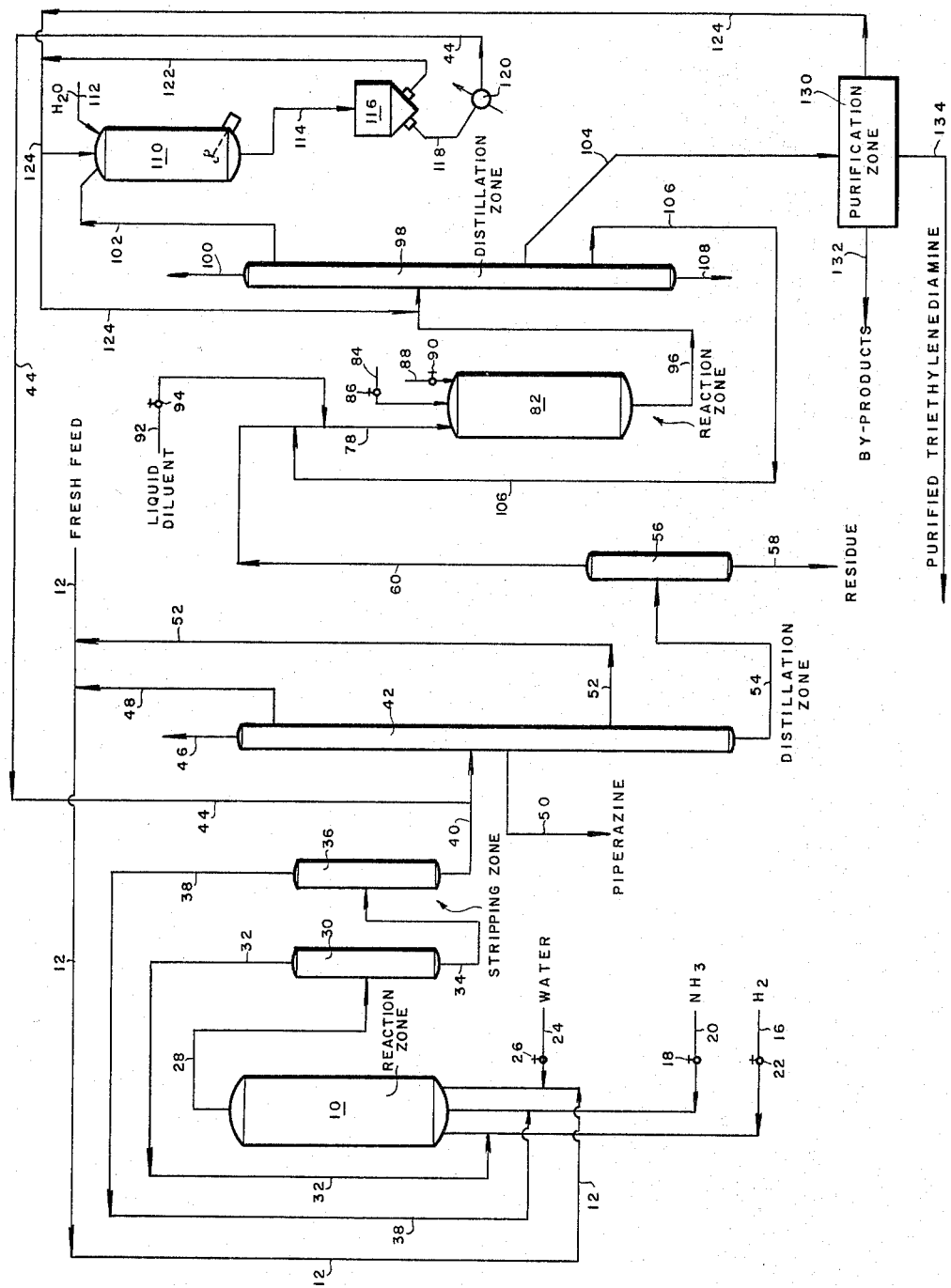
INVENTORS.
HERBERT G. MUHLBAUER,
MRYL LICHTENWALTER,
BY
*Carl G. Ries*
ATTORNEY.

3,285,920
COMBINATION PROCESS FOR PRODUCING PIPER-
AZINE AND TRIETHYLENEDIAMINE
Herbert G. Muhlbauer and Myrl Lichtenwalter, Austin,
Tex., assignors to Jefferson Chemical Company, Inc.,
Houston, Tex., a corporation of Delaware
Filed Jan. 16, 1964, Ser. No. 338,205
3 Claims. (Cl. 260—268)

This invention relates to a combination process for the production of a plurality of products from a single feed stock. More particularly, this invention relates to an improved process for the production of piperazine and triethylenediamine, both in pure form from ethylene glycol or an aliphatic ethylenic amine.

Reductive amination processes are directed to the production of a single heterocyclic amine. The preparation of piperazine is disclosed, for example, in MacKenzie U.S. Patent No. 2,861,995, Herrick U.S. Patent No. 2,937,176 and Moss et al. U.S. Patent No. 3,037,023. The preparation of triethylenediamine is disclosed in U.S. Patents Nos. 2,937,176, 2,977,363, 2,977,364, 2,985,658, 3,056,788, and copending, coassigned Brader applications Serial No. 167,960 filed January 22, 1962, now U.S. Patent No. 3,120,526, and Serial No. 182,122 filed March 23, 1962, now abandoned.

As demonstrated by the foregoing and similar publications, comparatively severe catalytic reductive amination reaction conditions are used in order to produce either piperazine or triethylenediamine. However, cyclizing catalytic reductive amination reactions of this nature are notoriously non-selective. Thus, a wide variety of side reactions normally occur, including cracking reactions and condensation reactions that lead ultimately to the formation of a wide variety of either acyclic or heterocyclic by-products.

Thus, piperazine will normally appear in the liquid amine products of the reaction in an amount varying from as little as 5% up to not more than about 40% or 50%. Moreover, the impurities or by-products formed by such side reactions have chemical and physical properties closely related to the properties of the desired product whereby purification of the piperazine is extremely difficult. Thus, side reaction by-products frequently boil in approximately the same boiling range as the desired product and therefore the desired product is recovered by distillation only with difficulty. Moreover, higher boiling by-products such as N-aminoethylpiperazines are still more difficult to recover because of the increasing complexity of the reaction products, both with respect to the number of compounds present and the similarity between freezing points and other physical characteristics. N-aminoethylpiperazine is a valuable by-product which is useful for the preparation of triethylenediamine.

In contrast to the foregoing, a combination process has been discovered which, surprisingly, gives improved yields of purified piperazine and triethylenediamine (which is prepared from by-product N-aminoethylpiperazine) and permits the over-all selectivity to desired products to be significantly enhanced.

The process of the present invention may be described briefly as a proces wherein an ethylenic feed stock, as hereafter defined, is contacted with a hydrogenation catalyst in a reaction zone under reaction conditions of elevated temperature and pressure sufficient to bring about cyclization and the formation of piperazine; whereby by-products, including N-aminoethylpiperazine, will be formed; wherein the total product from said reductive amination reaction zone is fractionated in a fractional distillation zone into a purified piperazine fraction, a heavy distillate fraction and a broad boiling-range residue fraction boiling above about 180°; wherein said boiling-range residue fraction is further fractionated into a second feed stock fraction boiling within the range of about 180° to about 250° C., comprising N-aminoethylpiperazine and a second heavy residue fraction; wherein said second feed stock fraction is thereafter brought into contact with a cyclization catalyst such as a tungsten catalyst, a silica-alumina catalyst, an organic acid, a phosphate salt (e.g., aluminum phosphate) in a second reaction zone to simultaneously produce additional piperazine and substantially pure triethylenediamine. Thus, in accordance with the present invention, the second feed stock is brought into contact with a cyclization catalyst of the class herein described under a particular set of reaction conditions suitable for converting N-aminoethylpiperazine to triethylenediamine.

*Fresh feed stocks*

The fresh feed stock for the present invention should comprise a compound or a mixture of two or more compounds having the formula:

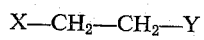

$$X\text{—}CH_2\text{—}CH_2\text{—}Y$$

wherein:

X represents —OH or —NH$_2$;
Y represents X or —(NH—CH$_2$—CH$_2$)$_n$—X; and
$n$ is an integer of 1 to 3.

Specific examples of feed stocks falling within the above definition include ethylene glycol, ethanolamine, diethanolamine, aminoethylethanolamine, ethylenediamine, diethylenetriamine, triethylenetetramine, tetraethylene pentamine, etc., or mixtures thereof.

*Suitable catalysts for preparing piperazine by
amination of the fresh feed stock*

A large number of hydrogenation catalysts may be employed for the initial production of piperazine. Such catalysts will normally be solid metalliferous catalysts containing one or more of the metals from the group including copper, nickel, cobalt, platinum, palladium and rhodium, or oxides thereof. Metal oxides from this group, as employed in the reaction, will normally be reduced to metallic form during the course of the reductive amination. Also, if desired, a promoting amount (e.g., 0.5–10 wt. percent) of a normally non-reducible metal oxide may also be utilized; such non-reducible metal oxide being selected from the group consisting of chromium oxide, molybdenum oxide, manganese oxide and thorium oxide. The preferred catalyst, that is, those which are most effective for the reaction, are selected from the group consisting of the metals copper, nickel and cobalt, and oxides thereof. The catalyst may be prepared as a mixture of oxides as, for example, nickel oxide-copper oxide-chromium oxide. This catalyst in reduced, active form may consist of copper and nickel in combination with chromium oxide.

The catalyst may be carried on an inert support, if desired, such as silica, filtros, alumina, etc.

A particularly effective group of catalysts are those having the composition calculated in mol percent on an oxide-free basis of 60% to 85% nickel, 14% to 37% copper and 1% to 5% chromium with the preferred composition being 72% to 75% nickel, 20% to 25% copper and 1% to 3% chromium. Catalysts of this nature are disclosed and claimed, for example, in coassigned, copending application Serial No. 34,623 filed June 8, 1960. The reductive amination process may be conducted continuously or batch-wise. In a batch process, the amount of catalyst generally employed is between about 5% to about 20% by weight of the fresh feed stock.

It is necessary to use added hydrogen for the reductive amination reaction. Thus, hydrogen should preferably contribute at least 10 and more preferably from about 20 to about 200 atmospheres partial pressure of the total pressure of the reaction system.

Also, the reductive amination reaction should be conducted in the presence of ammonia (e.g., at least 1, and preferably 2 to 10 mols of ammonia per mol of fresh feed stock).

In addition, it is frequently desirable to use added water in the reductive amination reaction, water preferably being added in an amount from about 1 to 100 wt. percent, based upon the weight of the total normally liquid non-aqueous feed to the reactor.

The reaction conditions to be employed in the reductive amination zone will suitably include a reaction temperature within the range of about 150° to about 400° C. and a contact time corresponding to a feed rate of about 0.1 to 3 pounds of amine feed per hour per pound of catalyst. It will be understood that long contact times will be used at low temperatures and that short contact times will be used at high temperatures. A preferred temperature range is from about 200° to about 300° C. and a preferred contact time corresponds to a feed rate of about 0.4 to about 0.8 pound of amine feed per hour per pound of catalyst. The reaction is suitably run at a pressure from about 30 to about 400 atmospheres, 65 to 225 atmospheres being preferred.

Work-up of reductive amination products

As has been indicated, a wide variety of products will be formed when the feed stock is subjected to reductive amination under the conditions described above. In accordance with the present invention, the total reaction product is worked up in the following manner.

The total reaction product is charged to a distillation zone comprising at least one, but more preferably a plurality of distillation columns. Thus, for example, the total reactor product may be treated first for the selective removal of hydrogen, which is preferably employed for recycle. Next, the reactor product may be treated for the removal of ammonia and at least a portion of the water to provide an aqueous ammonia stream which is also preferably recycled. The remaining normally liquid components are passed to the distillation zone wherein they are fractionated into a first light distillate product comprising water and, in some situations, a minor amount of light reaction by-products. The light distillate fraction is preferably discarded from the system.

The next fraction to be taken is an ethylenediamine distillate fraction such as a fraction boiling within the range of about 102° to 145° which may be recycled or recovered as a product.

Next, a concentrated piperazine product fraction boiling within the range of 145° to 152° C. is obtained.

The next fraction to be taken is a monoethanolamine distillate fraction such as a fraction boiling within the range of about 152° to about 180° C. which is preferably recycled to the reaction zone.

The residue, which will comprise a mixture of amines boiling above about 180°, is subjected to a further work-up in accordance with the present invention; this preferably being accomplished in a vacuum distillation zone wherein the first residue fraction, above described, is split into a second feed stock fraction boiling within the range of about 180° to about 250° C. and a second residue fraction boiling above 250° C. which is preferably discarded from the system.

The second feed stock fraction will normally contain a major amount (i.e., more than 50 wt. percent) of N-aminoethylpiperazine, lesser amounts of diethylenetriamine, aminoethylethanolamine and hydroxyethylpiperazine and minor amounts of other high-boiling amine by-products. However, because of the chemical and physical characteristics of the components of the fraction, purified N-aminoethylpiperazine is obtained from this fraction in good yields by additional distillation only with great difficulty.

In accordance with the present invention, this second feed stock fraction is utilized as a feed stock for a second conversion whereby additional piperazine and substantially pure triethylenediamine are obtained.

Conversion of second feed stock to triethylenediamine and piperazine

In accordance with the present invention, the second feed stock fraction is charged without further treatment to a second reaction zone wherein the second feed stock is brought into contact with a cyclization catalyst under reaction conditions conducive to the formation of triethylenediamine. As was set forth more fully in prior publications, as above identified, such as U.S. Patent No. 3,056,788, such reaction conditions may include a temperature within the range of about 200° to 500° C., a pressure of from about 0.1 p.s.i.a. to about 5,000 p.s.i.g., a space velocity from about 0.1 to about 20 pounds of said second feed stock per hour per pound of catalyst; such reaction being conducted in either liquid phase or in vapor phase. If a liquid phase reaction is employed, it is preferable to dissolve the said second feed stock in a nonreactive diluent such as water, or a monocyclic aromatic hydrocarbon such as benzene, toluene, xylenes, trimethylbenzenes, etc.

Any suitable cyclization catalyst may be used, such as a silica-alumina cracking catalyst comprising, for example, from about 60 to about 95 wt. percent of silica and, correspondingly, from about 40 to about 5 wt. percent of alumina. It will be understood that conventional modifiers such as alkaline earth metal oxides, alkali metal oxides, zirconia, etc., may also be present in the composition. Other catalysts include a tungsten catalyst as shown and described in U.S. Patent No. 3,056,788; an organic acid as shown in U.S. Patent No. 3,080,371; a base-treated silica-alumina as shown in Brader application Serial No. 167,960, filed January 22, 1962; a phosphate salt such as aluminum, iron, etc.; phosphate as shown in copending Brader et al. application Serial No. 182,122 filed March 23, 1962, etc.

As a result of this treatment, a significant portion of the second feed stock is converted to triethylenediamine and another significant portion is converted to piperazine. Since the second feed stock comprises a mixture of a variety of materials, it would not be obvious that good selectivity with both piperazine and triethylenediamine could be obtained at the same time.

A still further feature of the present invention is to accomplish the contacting of the second feed stock in the presence of added hydrogen or added ammonia or both (e.g., from about 1 to about 10 mols of ammonia per mol of feed stock, about 1 to 150 atmospheres partial pressure of hydrogen, or both). Ammonia is preferably added since it surprisingly and significantly affects the selectivity of the various reactions involved, whereby there is a significant reduction in residue formation, substantially all of which appears as triethylenediamine.

Work-up of second reaction product

A second reaction product is formed as a result of contacting the second feed stock with a solid acidic catalyst.

The second reactor product is preferably charged to a second distillation comprising at least one, but preferably a plurality of distillation columns. Within the second distillation zone, the second reaction product is preferably fractionated into a light overhead fraction comprising ammonia, water and products boiling below piperazine, including N-methylpiperazine, ethylenediamine, etc. This fraction may be discarded from the system when the value of the potentially recoverable materials in the fraction is slight or may be further treated to recover components thereof for recycle (e.g., ammonia, ethylenediamine, etc.).

The next fraction that is recovered is a piperazine boiling range fraction which, however, because of the presence of cracking products such as N-methylpiperazine, N-ethylpiperazine, etc., is impure and not suitable for commercial use.

The third fraction that is obtained is a fraction boiling within the range of triethylenediamine. This fraction likewise is contaminated with materials such as piperazine, N-ethylpiperazine, unreacted aminoethylpiperazine, etc., which are difficult to remove by distillation. As a consequence, this fraction is not suitable for commercial use.

The fourth fraction that is obtained is a fraction boiling within the range of aminoethylpiperazine, which is preferably recycled to the second reaction zone.

The residue fraction that is obtained, boiling above about 250° C. is preferably discarded from the process.

The piperazine distillate fraction, mentioned above, is dissolved in water and cooled to a temperature of about 43° C. or lower, whereby it is resolved into a precipitated piperazine hexahydrate fraction, which, although not suitable as such for commercial use, will contain only minor amounts of boiling by-products such as N-methylpiperazine, etc., that are difficult to remove by distillation. Accordingly, the precipitated piperazine hexahydrate fraction is preferably recycled to the first distillation zone.

The filtrate fraction, comprising water, piperazine and some N-methylpiperazine, and a small amount of triethylenediamine, is preferably recycled to the second distillation zone whereby the N-methylpiperazine by-product is ultimately removed overhead.

The impure triethylenediamine fraction is purified in any suitable manner (hereafter described).

The present invention will be further illustrated with respect to the accompanying drawing wherein the single figure is a schematic flow sheet illustrating the preferred method for the continuous practice of the present invention. In the drawing, equipment is shown schematically and ancillary features such as valves, pumps, heaters, coolers, reflux equipment, reboiler equipment, flow controls, etc., have not been shown since these items are familiar to those skilled in the art and do not form a part of the present invention.

Turning now to the drawing, there is shown schematically a first reaction zone 10 to which a fresh feed stock of the present invention is charged by way of a charge line 12. While any suitably ethyleneamine feed stock, as above described, may be utilized, a preferred feed stock is monoethanolamine, and the drawing will be described with respect to this feed stock.

The reactor 10, in accordance with this embodiment of the present invention, will contain a fixed bed of a solid hydrogenation catalyst, as above described, such as a pelleted catalyst composed of the metals or oxides of nickel, copper and chromium and containing, on an oxide-free basis, about 75 mol percent nickel, about 23 mol percent copper and about 2 mol percent chromium. Preferably, the pelleted catalyst is a catalyst which has been prereduced with hydrogen whereby the nickel and copper are at least partially present in metallic form and whereby the chromium is present as chromium oxide.

The ethanolamine and recycle fractions, if any, will be passed into reactor 10 by way of charge line 12 at an amine feed stock charge rate which is preferably within the range of about 0.4 to about 0.8 pound of total amine feed stock per hour per pound of catalyst.

The monoethanolamine is preferably brought into contact with the hydrogenation catalyst in the presence of hydrogen and ammonia. Hydrogen may be initially added by way of a charge line 16 controlled by a valve 22 in amounts sufficient to provide at least 10 and, more preferably, from about 100 to about 200 atmospheres of hydrogen. Ammonia may be initially charged by way of a charge line 20 controlled by a valve 18 in an amount sufficient to provide at least 1, and more preferably, from about 2 to about 15 mols of ammonia per mol of monoethanolamine. Water is also preferably charged to the reaction zone 10; water, for example, being initially charged by way of a water charge line 24 controlled by a valve 26 leading to the ethanolamine charge line 12. The amount of water initially added will be such that the reaction mixture contains from about 1 to about 50 wt. percent of water, based on the weight of the total liquid feed to the reactor.

Within reaction zone 10, reaction conditions will preferably include a temperature within the range of about 200° to about 300° C. and a pressure within the range of about 100 to about 200 atmospheres. As a consequence, at least a portion of the monoethanolamine is converted to a variety of amine products, including light cracked products, ethylenediamine, piperazine, N-aminoethylpiperazine, N-methylpiperazine, N-ethylpiperazine, N-hydroxyethylpiperazine, diethylenetriamine, etc.

The total products are discharged from reaction zone 10 by way of a line 28 leading to a stripping zone comprising a first stripper 30 wherein hydrogen is stripped overhead from the total reaction product by way of line 32 which preferably recycles to the hydrogen charge line 16 whereby hydrogen is added on a lined out basis only at a replacement rate. The bottoms from the first stripper 30 are discharged by way of a line 34 leading to a second stripper 36 wherein at least some of the water and the ammonia are removed overhead by way of a line 38 which preferably recycles to the ammonia charge line 20 whereby, on a lined out basis, ammonia and water are added by way of charge lines 20 and 24 only at replacement rates.

The bottoms of the second stripper 36 are discharged by way of a line 40 leading to a distillation zone 42 which is shown schematically in the drawing as a single distillation tower. It will be understood that in actual practice, zone 42 will comprise a plurality of distillation towers, such as a plurality of splitter towers equipped with appropriate reboilers, reboiler lines, reflux condensers, reflux lines, etc., in order to achieve effective distillation. Zone 42 is shown schematically since equipment necessary for the operation of the zone 42 is commercially available and does not constitute a part of the present invention. Although any type of distillation may be employed, the distillation equipment in zone 42 is preferably distillation equipment designed for simple atmospheric pressure operations.

A recycle stream 44 obtained in a manner to be described may also be charged to the distillation zone 42, recycle material in the line 44 being charged in admixture with the bottoms 40 from the second stripper 36.

Within the distillation zone 42, the reaction products are separated into a light overhead water fraction 46 boiling below about 100° C. and containing water, some ammonia and a minor amount of water-azeotroping amines, etc. This fraction is preferably discarded from the system.

A light distillate fraction 48 boiling within the range of about 100° to 145° C. is preferably taken and charged as recycle to reactor 10, line 48 preferably interconnecting with charge line 12 for the fresh feed stock.

A distillate fraction 50 boiling within the range of about 145° to about 150° C. and consisting essentially of piperazine is taken as product. When distillation is accomplished in accordance with the sequence described, this fraction will comprise about 95 wt. percent or more of piperazine and is frequently useful, as obtained, for commercial applications.

A heavier recycle distillate fraction 52 boiling within the range of about 150° to about 180° C. is also taken, the recycle fraction 52 preferably being charged to reactor 10 by way of fresh feed charge line 12.

The residue fraction from distillation zone 42 will comprise amines boiling above 180° C. and normally over the range of from about 180° to about 300° C. It is discharged from zone 42 by way of a bottoms line 54 leading to a second distillation zone 56. The distillation zone 56 may suitably comprise a vacuum distillation splitter tower or equivalent type distillation equipment.

Within the zone 56, the residue fraction 54 is split into a second residue fraction 58 boiling above 250° C. which is preferably discarded from the process. The distillate fraction 60 from distillation zone 56 boils within the range of about 180° to about 250° C. and is the second feed stock of the present invention.

The second feed stock 60 is an impure material comprising a mixture of high-boiling amines and normally including about 50 to 75 wt. percent N-aminoethylpiperazine, the remainder comprising diethylenetriamine, aminoethylethanolamine, hydroxyethylpiperazine and other related materials.

In accordance with the present invention, the second distillate fraction 60 is charged by way of a line 78 to a second reaction zone 82 which will preferably contain a fixed bed of a solid cyclization catalyst, such as a silica-alumina catalyst, a silica-free tungsten catalyst, a solid phosphate salt catalyst, etc.

The second feed stock 60 will be charged to the second reactor 82, preferably in the presence of ammonia and, optionally, in the presence of hydrogen.

The second feed stock 60 will preferably be charged to reaction zone 82 at the rate of from about 0.1 to about 20 pounds of feed stock per hour per pound of catalyst. Ammonia will preferably be added to reactor 82 by way of a charge line 84 controlled by a valve 86 at the rate of about 0.05 to about 0.5 pound per hour per pound of second feed stock 60. Hydrogen, if used, may be added to reactor 82 by way of a hydrogen charge line 88 controlled by valve 90 at the rate of about 10 to about 1,000 liters (STP) of hydrogen per hour per pound of catalyst. Temperature and pressure conditions within the reactor 82 may be adjusted to provide for either a liquid phase or a vapor phase reaction. Preferably, the reaction is conducted in vapor phase at substantially atmospheric pressure at a temperature within the range of about 200° to about 500° C. and, more preferably, at a temperature within the range of about 340° to about 440° C. In this situation, the feed stock will preferably be fed at the rate of about 0.1 to about 4 pounds of feed stock 60 per hour per pound of catalyst.

If desired, the reaction conducted in reactor 82 may be conducted in liquid phase. In this situation, a normally liquid diluent such as water or an aromatic hydrocarbon (e.g., benzene, toluene, xylenes, trimethylbenzenes, or a mixture thereof) is added by way of a liquid diluent charge line 92 controlled by a valve 94 at a rate within the range from about 0.2 to about 8 pounds of liquid diluene per pound of feed stock 60 per hour. If a liquid phase reaction is to be conducted, the liquid feed is preferably charged at the rate of about 2 to about 20 pounds per hour per pound of catalyst.

Within the reaction zone 82, a variety of reactions ensue, including cracking reactions, cyclization reactions and condensation reactions leading to the formation of a wide variety of reaction products. The reaction products are discharged from reactor 82 by way of a discharge line 96 leading to a third distillation zone 98 which, again, is shown schematically as a single distillation zone in order to simplify the drawing. It will be understood that the distillation zone 98 will preferably comprise a plurality of splitter columns designed for simple substantially atmospheric pressure distillation.

The reaction product charged to the distillation zone 98 is fractionated into a light overhead fraction 100 comprising normally gaseous feed components or reaction by-products such as hydrogen, ammonia, methane, water, water-azeotroping amines, ethylenediamine, N-methylpiperazine, etc. This fraction may be discarded or processed for the recovery therefrom of ammonia, hydrogen, N-methylpiperazine, etc. If portions of the fraction 100 are to be recycled, they may be recycled to either the reaction zone 82 or the reaction zone 10, or both.

A light distillate fraction boiling within the range of about 130° to about 160° C. and comprising piperazine, N-methylpiperazine and N-ethylpiperazine is discharged by way of line 102.

A third distillate fraction boiling in the range of 160° to 190° C. is discharged by way of line 104 and comprises triethylenediamine, together with some piperazine, N-ethylpiperazine and aminoethylpiperazine as contaminants.

A fourth distillate fraction 106 boiling within the range of 190° to 250° C. and comprising aminoethylpiperazine and minor amounts of other amines boiling within this range is preferably recycled to charge line 78 for reaction zone 82, inasmuch as this fraction constitutes a good recycle fraction.

A third residue fraction 108 boiling above about 250° C. is discharged from distillation zone 98 and is preferably discarded from the process.

The piperazine-containing fraction 102, because of the presence of N-methylpiperazine and N-ethylpiperazine, is unsuitable for commercial use and, moreover, is difficult to purify.

However, in accordance with the present invention, distillate fraction 102 is charged to a holding zone 110 where it is dissolved in at least about 60 wt. percent of water added by way of a line 112. The holding zone 110 is preferably maintained at a temperature of about 43° C. or lower whereby a crude piperazine hexahydrate precipitate is formed. The resultant aqueous slurry of piperazine hexahydrate crystals is discharged by way of a line 114 leading to a centrifuge 116 wherein the slurry is resolved into a piperazine hexahydrate filter cake fraction and a filtrate fraction.

The piperazine hexahydrate filter cake fraction is discharged from centrifuge 116 by way of a conduit 118 leading to a heater 120 wherein the filter cake is liquefied.

Alternately, the piperazine hexahydrate is dissolved in water in a solubilization zone (not shown). Piperazine hexahydrate obtained from centrifuge 116 is still not necessarily of commercial quality. In accordance with the present invention, the liquefied or solubilized piperazine hexahydrate is charged by way of recycle line 44 for distillation column 42, described above. As a consequence, the piperazine formed in the reaction zone 82 is recovered in purified commercial form in admixture with piperazine formed in reaction zone 10 in the distillation zone 42.

The filtrate is discharged from the centrifuge 116 by way of a line 122 which preferably leads to line 124 for recycle to the distillation zone 98 in order to permit the eventual elimination of N-methylpiperazine, etc., from the process by way of light ends discharge line 100.

The impure triethylenediamine fraction 104 is purified in any desired manner. Thus, for example, it may be charged to a purification zone 130 operated in the manner described in either Farkas U.S. Patent No. 2,950,282, Mascioli U.S. Patent No. 3,045,018, copending, coassigned application Serial No. 111,021 filed May 18, 1961 and entitled "Purification of Amines," copending, coassigned Lichtenwalter et al. U.S. application Serial No. 200,849 filed June 7, 1962, etc. Thus, within the zone 130, the fraction 104 may be separated into a by-products fraction discarded by line 132, a recycle fraction 124 comprising piperazine, N-ethylpiperazine, N-aminoethylpiperazine, etc., and a product fraction 134 consisting essentially of triethylenediamine, the monohydrate thereof or the hexahydrate thereof (depending on the recovery method employed in zone 130).

Operation

By way of a specific example of the operation of the present invention, the fresh feed stock added by way of line 12 may be monoethanolamine, and the catalyst in reactor 10 may be a nickel, copper, chromium oxide catalyst containing 75 mol percent nickel, 23 mol percent copper and 2 mol percent chromium on an oxide-free basis.

In a lined-out operation, fresh ethanolamine charged by way of line 12 and recycle fractions 48 and 52 may be charged to reaction zone 10, together with added ammonia, hydrogen and water.

In this situation, the reaction products in the line 28 will comprise hydrogen, ammonia, water (in a major amount), ethylenediamine, monoethanolamine, piperazine, diethylenetriamine, N-aminoethylpiperazine, N-aminoethylethanolamine, N-hydroxyethylpiperazine and heavier amine by-products.

In this situation, the recycle fraction 48 will consist essentially of ethylenediamine and water while the recycle fraction 52 will be composed primarily of unconverted monoethanolamine.

Also, in this situation, the second feed stock 60 taken as distillate from distillation zone 56, will comprise about 50 to 75 wt. percent of N-aminoethylpiperazine, diethylenetriamine, N-aminoethylethanolamine, N-hydroxyethylpiperazine and a minor amount of mixed heavy amines boiling in the indicated range.

The second feed stock fraction 60 is charged by way of lines 60 and 78 to reaction zone 82 for the production of more piperazine and triethylenediamine. The following results have been observed.

The second feed stock 60 was charged to a reactor 82 containing a fixed bed of synthetic silica-alumina containing about 86 wt. percent silica and about 12 wt. percent alumina. In this situation the feed stock 60 was the only fresh feed to reactor 82 and was passed therethrough at the rate of about two pounds per hour per pound of catalyst at about atmospheric pressure at a temperature of about 375° C.

The liquid reaction product had the composition set forth in Table I.

TABLE I

Yield, wt. percent, based on stream 60 fed to reactor 82

| | |
|---|---|
| Triethylenediamine | 20.8 |
| Piperazine | 10.2 |
| Amine by-products | 11.2 |
| Residue | 21.1 |
| Lights (incl. vent loss) | 22.7 |

In a second run, the feed stock 60 was charged at the rate of about 2.13 pounds per pound of catalyst per hour at the indicated reaction temperature and pressure. In addition, about 0.1 pound ammonia per pound of feed stock 60 per hour was also charged by way of line 84.

The products of the reaction had the composition set forth in Table II.

TABLE II

Yield, wt. percent, based on stream 60 fed to reactor 82

| | |
|---|---|
| Triethylenediamine | 26.0 |
| Piperazine | 11.0 |
| Amine by-products | 12.8 |
| Residue | 15.5 |
| Lights (incl. vent loss) | 18.7 |

In comparing the results of Table I with the results of Table II, it will be seen that a surprising result was obtained through the use of added ammonia. Thus, the yield of triethylenediamine was increased by about 30 wt. percent while the yield of residue was decreased by a like amount. At the same time, piperazine was produced at about the same rate; this was also the case with the other fractions. It is thus seen that ammonia had a pronounced effect upon the course of the reaction which would not be expected or predictable in view of the mixture of the material used as feed stock.

As indicated, in accordance with one embodiment of the present invention, purified aminoethylpiperazine obtained from line 60 on rerunning of the second feed stock 60 is utilized as a charge stock for the reactor 82. It has been observed that this feed stock, when fed to reactor 82 by itself at the rate of about 2.2 pounds per pound of catalyst per hour at about atmospheric pressure at a temperature of about 375° C. provides for a reaction product having the composition set forth in Table III.

TABLE III

| | Yields, Percent Based on Aminoethylpiperazine | |
|---|---|---|
| | Charged | Converted |
| Triethylenediamine | 24.4 | 25.1 |
| Piperazine | 12.0 | 12.2 |
| Residue | 21.7 | 22.3 |
| Methyl and ethylpiperazines | 9.3 | 9.6 |
| Others | 12.6 | 13.0 |

With the same feed stock, but with the addition of about 0.1 pound of ammonia per pound of feed per hour, the composition of the product is that set forth in Table IV.

TABLE IV

| | Yields, Percent Based on Aminoethylpiperazine | |
|---|---|---|
| | Charged | Converted |
| Triethylenediamine | 26.8 | 28.8 |
| Piperazine | 12.6 | 13.5 |
| Residue | 19.1 | 20.4 |
| Methyl and ethylpiperazines | 9.2 | 9.8 |
| Others | 12.3 | 13.1 |

With reference to Table III and Table IV, it will be seen that ammonia again had a beneficial effect upon selectivity although the change was not so pronounced as in the case of Examples III and IV.

Of greater significance is the fact that the impure feed stock for Table I gave a yield of triethylenediamine substantially equivalent to that obtained with pure aminoethylpiperazine, this demonstrating an unexpected effect of amonia on at least some of the components of the feed stock for Table I other than N-aminoethylpiperazine. Thus, it would normally be expected that the use of an impure feed stock would result, at best, in a reduction in yield and, at worst, in an unsatisfactory process.

Having thus described the invention, what is claimed is:

1. In a method which comprises the steps of bringing an amine feed stock into contact with a hydrogenation catalyst in a primary reaction zone in the presence of hydrogen and from about two to about ten mols of ammonia per mol of amine feed stock under conditions of temperature and pressure sufficient to cyclize at least a portion of said feed stock to form piperazine and N-aminoethylpiperazine, whereby a first reaction product is formed comprising an amine mixture, the improvement which comprises:

(A) separating said first reaction product in a first separation zone into at least a piperazine fraction and a substantially piperazine-free distillate second feed stock fraction boiling within the range of about 180° to about 250° C. and comprising N-aminoethylpiperazine, (B) separately bringing said second feed stock into contact with a cyclization catalyst in a second reaction zone in the presence of from about 0.05 to about 0.5 pound of ammonia per pound of said second feed stock under conversion conditions to convert the second feed stock into a second reaction product comprising water, piperazine, N-methylpiperazine, N-ethylpiperazine and triethylenediamine, (C) separately separating said second reaction product in a second separation zone into a water fraction comprising reaction by-products, including N-methylpiperazine and N-ethylpiperazine, a triethylenediamine fraction and a crude piperazine fraction contaminated with N-methylpiperazine and N-ethylpiperazine, (D) recovering triethylenediamine from said triethylenediamine fraction, and (E) discarding at least a portion of said water fraction, (F) dissolving said crude piperazine fraction in at least 60 wt. percent of water to form an aqueous solution, (G) holding said aqueous solution at a temperature of not more than 43° C. to form a slurry containing a crude piperazine hexahydrate precipitate and a mother liquor containing substantially all of the N-methylpiperazine and N-ethylpiperazine in said crude piperazine fraction, (H) resolving said slurry into a piperazine hexahydrate fraction and a mother liquor fraction, (I) recycling said crude piperazine hexahydrate precipitate to said first separation zone and (J) recycling said mother liquor fraction to said second separation zone whereby said N-methylpiperazine and said N-ethylpiperazine contaminants are removed with said water fraction, (K) said amine feed stock comprising a compound having the formula:

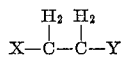

wherin X is selected from the group consisting of —OH and —NH$_2$, Y is selected from the group consisting of X and

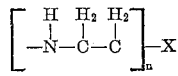

wherin $n$ is an integer of from 1 to 3.

2. A method as in claim 1 wherein the amine feed stock is an elthanolamine.

3. A method as in claim 2 wherein the ethanolamine is monoethanolamine.

References Cited by the Examiner

UNITED STATES PATENTS

| | | | |
|---|---|---|---|
| 2,861,995 | 11/1958 | MacKenzie | 260—168 |
| 2,937,176 | 5/1960 | Herrick | 260—268 |
| 2,985,658 | 5/1961 | Krause | 260—268 |
| 3,038,904 | 6/1962 | Godfrey | 260—268 |
| 3,056,788 | 10/1962 | Brader | 260—268 |
| 3,112,318 | 11/1963 | Lemon et al. | 260—268 |
| 3,148,190 | 9/1964 | Swanson | 260—268 |
| 3,151,115 | 9/1964 | Moss et al. | 260—268 |

FOREIGN PATENTS 678,537  9/1952  Great Britain.

ALEX MAZEL, *Primary Examiner.*

J. W. ADAMS, *Assistant Examiner.*